United States Patent [19]
Sisk

[11] Patent Number: 4,909,814
[45] Date of Patent: Mar. 20, 1990

[54] DUST FILTERING AND COLLECTION SYSTEM

[76] Inventor: David E. Sisk, R.R. #1, Box 340, Bonne Terre, Mo. 63628

[21] Appl. No.: 233,359

[22] Filed: Aug. 18, 1988

[51] Int. Cl.$^4$ ............................................. B01D 46/04
[52] U.S. Cl. .................................... 55/304; 55/341.1; 55/378; 55/381; 55/430; 55/431; 55/528
[58] Field of Search ................... 55/341.1, 304, 97, 96, 55/302, 378, 341.2, 430, 431, 432, 528, 381

[56] References Cited

U.S. PATENT DOCUMENTS

| 2,717,658 | 9/1955 | Bethea et al. | 55/97 |
| 2,966,232 | 12/1960 | Austin | 55/97 |
| 3,365,065 | 1/1968 | Varjabedian | 55/341.1 |
| 3,473,300 | 10/1969 | Wilm et al. | 55/302 |
| 3,695,007 | 10/1972 | Farnworth | 55/341.1 |

FOREIGN PATENT DOCUMENTS

3114068 11/1982 Fed. Rep. of Germany ........ 55/302

Primary Examiner—Bernard Nozick
Attorney, Agent, or Firm—Paul M. Denk

[57] ABSTRACT

A dust filtering and collection system for filtering dust particles from an incoming dust laden air stream is disclosed. When used in a mobile vacuum loading/unloading vehicle, the system separates dust particles from the incoming dust laden air stream in a dust filtering and collection canister or chamber and then exhausts the dust cleansed air stream from the canister or chamber. Dust particles filtered from the dust cleansed air stream are collected as accumulated product particles along a bottom area of the canister or chamber. The accumulated product particles may then be transferred to a storage chamber from which the incoming dust laden air stream has emanated. In addition, the dust filtering system of the present invention includes a plurality of juxtaposed hollow polymer tubes which are suspended and supported by a transverse panel extending across the canister or chamber adjacent an upper end thereof, with each hollow polymer tube being sealed relative to the transverse panel and having a porosity permitting air to be drawn therethrough while removing dust particles from the incoming dust laden air stream. The construction and arrangement of the hollow polymer tubes, within a dust filtering and collection canister or chamber, provides a highly efficient, continuously operating, self-cleaning filtering system, for use in mobile vacuum loading/unloading vehicles or in other industrial filtering systems.

25 Claims, 4 Drawing Sheets

DUST FILTERING AND COLLECTION SYSTEM

BACKGROUND OF THE INVENTION

The present invention relates to a dust filtering and collection system, and more particularly, to a dust filtering and collection system for use in mobile vacuum loading/unloading vehicles or other industrial environments, and to a dust filtering system employing hollow polymer tubes suspended within a dust filtering and collection canister or chamber.

Pneumatic conveying systems are widely employed for transporting free flowing material, i.e., starch, flour, Kaolin clay, soda ash, hydrate lime, plastic pellets, etc., from a railcar to a hopper truck, from a hopper truck or railcar to storage, or from storage to a railcar or hopper truck. In all such examples, the pneumatic conveying system employed may include a vacuum driven system, a pressure driven system or a combination vacuum/-pressure driven system.

In any of the aforementioned pneumatic conveying systems, heavier product particles are transported between locations as desired; however, lighter particles are captured in the moving air stream, and thus become part of a dust laden air stream. Where bulk products are transported from a railcar to a hopper truck, for example, dust laden air is generated within the storage chamber of the hopper truck, and then is transported as a dust laden air stream in the air flow return path of the pneumatic conveying system.

To alleviate the build up of the incoming dust laden air stream, dust filtering systems have been employed in the air flow return path, for cleaning and removing dust particles from the dust laden air stream, in order to provide a dust cleansed air stream which can then be exhausted back into the storage chamber. Typically, such dust filtering systems are of the dry bag type in which a series of juxtaposed, elongated air bags made of woven textiles or porous cloth materials are employed in the dust filtering and collection canister or chamber for removing dust particles from the dust laden air stream. Examples of such dust filtering systems which include dry air bags are shown in U.S. Pat. Nos.: 3,480,330; 4,017,281; 4,264,345; 4,433,987; 4,435,197; and 4,452,617. In lieu of woven textile or porous cloth fabrics, some dry bags have been of pleated paper tubes, as disclosed, for example, in U.S. Pat. No. 4,007,026. There have even been some welded or seamed filter tubes made from polymer or plastic material in some types of dust filtering systems.

In all of the aforementioned examples employing fabric (textiles or paper) bag or tube constructions, the life cycle of the fabric bags or tubes is very limited, not only because of the filtering operation itself, because the fabric bags or tubes are subjected to vigorous movement back and forth relative to one another in the canister or chamber, causing the fabric bags or tubes to come into contact with one another and other structural elements within the canister or chamber. In addition, the manner in which the fabric bags or tubes are suspended within the canister or chamber does not provide a structurally supported and sealed arrangement which enhances long life. Furthermore, cleaning of the fabric bags or tubes is required, generally after each loading or unloading operation, and in some cases even several times during the loading/unloading operation. As can be appreciated, all of the above circumstances can substantially limit the life cycle of the fabric bags or tubes in the dust filtering system.

Another problem in using dust filtering systems is that after the dust is filtered from the dust laden air stream, the accumulated product particles, formed from the collected dust particles, are simply thrown away. For example, in a mobile vacuum loading/unloading hopper truck, as disclosed, for example, in U.S. Pat. No. 4,227,993 where cyclone separators are employed, and in other dust filtering systems, such as U.S. Pat. No. 3,480,330, a valve below the canister or chamber in the dust filtering system is typically opened and the collected dust particles, are then simply dumped into a box or other container and thrown away. When removed from the self-contained pneumatic conveying system, the accumulated product particles are considered to be contaminated, and so they are simply thrown away as waste. In some cases, up to 500 pounds of accumulated product particles, filtered off by the dust filtering system, are thrown away as contaminated products. As will be appreciated, the product waste in current dust filtering systems cannot be economically justified, if there was any possible way of re-claiming or re-cycling the accumulated product particles back into a storage chamber from which the dust laden air stream emanates.

SUMMARY OF THE INVENTION

Among the several objects and advantages of the present invention may be noted:
the provision of a new and improved dust filtering and collection system which overcomes the aforenoted deficiencies of the prior art;
the provision of the aforementioned dust filtering and collection system which continuously and repeatedly removes dust particles from a dust laden air stream in a dust filtering system, enabling the dust cleansed air stream to be fed back into the pneumatic conveying system;
the provision of the aforementioned dust filtering and collection system which collects the dust particles as accumulated product particles within the canister or chamber, and then returns the accumulated product particles to a storage chamber from which the incoming dust laden air stream emanated, so as to eliminate any waste in the dust filtering and collection system;
the provision of the aforementioned dust filtering and collection system wherein the accumulated product particles are transported from the canister or chamber of the dust filtering and collection system to a storage chamber for the use of gravity and/or air flow;
the provision of the aforementioned dust filtering and collection system in which the accumulated product particles are recovered and returned to a storage chamber which is either part of or separate from a mobile vacuum loading/unloading vehicle;
the provision of the aforementioned dust filtering and collection system which fully meets all state and city emission standards regardless of the type of product involved or the amount of time required for the filtering operation;
the provision of the aforementioned dust filtering and collection system wherein the dust filtering system utilizes a plurality of juxtaposed hollow polymer tubes which are constructed and mounted relative to a transverse panel within a canister or chamber so as to be structurally suspended in a stable and sealed manner relative thereto for durable and long term, life cycle filtering use;

the provision of the aforementioned dust filtering and collection system wherein the seamless polymer tubes provide a highly efficient, continuously operating, self-cleaning filtering system for use in mobile vacuum loading/unloading vehicles or in other industrial filtering systems;

the provision of the aforementioned dust filtering and collection system in which each of the hollow polymer tubes have a porosity permitting air to be drawn therethrough while removing dust particles from an incoming dust laden air stream entering an associated canister or chamber; and the provision of the aforementioned dust filtering and collection system which operates more efficiently over longer periods with less air flow restriction than other prior art devices, and yet requires a minimum number of non-moving components in a new and improved construction which is fully adapted for all of the intended purposes as described herein.

Briefly stated, the dust filtering and collection system that is used in conjunction with the mobile vacuum loading/unloading vehicle includes an enclosed dust filtering and collection canister having a bottom wall, peripheral side wall and closed top. A dust filtering system is suspended within the dust filtering and collection canister. A dust inlet is provided in the side wall of the canister below the dust filtering system and is adapted to be connected to an incoming dust laden air stream. Above the dust filtering system, a clean air outlet is adapted to be connected to a vacuum source to draw the incoming dust laden air stream past the dust filtering system for removing the dust therefrom to allow clean air to be withdrawn through the clean air outlet while, at the same time, enabling collection of dust particles as accumulated product particles along the bottom wall of the canister.

Means are provided for recovering and returning the accumulated product particles to a storage chamber from which the dust laden air stream has emanated and in which the accumulated product particles are collected and stored in bulk quantity. The means for recovering and returning the accumulated product particles to the storage chamber includes a recovery chamber and a passageway interconnecting the recovery chamber to a vacuum line carrying the accumulated product particles to the storage chamber. Deflector means incorporated in the vacuum line may be used to establish a greater vacuum therein, in order to facilitate a quicker and more efficient return of the accumulated product practices to the storage chamber. Valve means permitting gravity and/or air flow transport of the accumulated product particles from the canister and recovery chamber to the storage chamber may be provided. In those instances where accumulated particles product are conveyed by gravity or air flow into a product discharge line, a venturi effect may also be established to facilitate the conveyance of the accumulated product particles into the product discharge line.

The dust filtering and collection system may be mounted on a storage chamber, such as a hopper truck, from which the dust laden air stream emanates. Alternatively, the storage container may be a storage facility that is separate from the dust filtering and collection system.

The method of filtering and collecting filtered dust particles from an incoming dust laden air stream entering an enclosed dust filtering and collection chamber includes the steps of separating dust particles from the incoming dust laden air stream, exhausting the dust cleansed air stream from the dust filtering and collection chamber, collecting the dust particles as accumulated product particles within the chamber, and returning the accumulated product particles to a storage chamber from which the incoming dust laden air stream has emanated.

In addition to the aforementioned dust filtering and collection system and method of filtering and collecting filtered dust particles from an incoming dust laden air stream, the dust filtering system of the present invention may be incorporated within a mobile vacuum loading/unloading vehicle or may be used as a separate industrial filtering system. In the environment used, the dust filtering system is suspended within the dust filtering and collection canister and includes a plurality of juxtaposed hollow polymer tubes which are suspended and supported by a transverse panel extending across the canister or chamber adjacent an upper end thereof. Each of the polymer tubes are sealed relative to the transverse panel and have a porosity permitting air to be drawn therethrough while removing dust particles from an incoming dust laden air stream entering a dust inlet.

Each of the tubes have a closed lower end extending below the transverse panel and open upper end extending above the transverse panel. The closed lower end of the tubes may be provided by crimping and sealing wall sections formed from each polymer tube. For mounting the individual hollow polymer tubes in the transverse panel, individual tube grommets made of resilient material are mounted with openings in the transverse panel for retaining and sealing the hollow polymer tubes therein. Each hollow polymer tube preferably has an enlarged head surrounding the open upper end thereof and the tube grommets have a complementary enlarged head for engaging the enlarged head of the hollow polymer tube on one side of the transverse panel so as to restrict movement of the tubes in one direction. The tube grommets are deformed by a marginal circumferential surface surrounding each opening in the transverse panel for engaging an opposite side of the transverse panel to limit movement of the polymer tubes in an opposite direction. Alternatively, an internal wall of the grommets may be provided with 0-ring-like sections to provide better seating and/or gripping of the hollow polymer tubes, particularly under high pressure conditions of operation.

The hollow polymer tubes are preferably made from polyethylene or teflon with about a 40-50 micron porosity at the outer wall of the tubes, which may extend through tortuous paths to restricted openings of about 2.5 microns along an inner wall thereof. The transverse panel is circumferentially supported by a canister flange with a surrounding gasket being engaged by a separate closed top overlying the canister and engaging the gasket to provide the aforementioned enclosed dust filtering and collection canister or chamber. An alternative embodiment may include an internal shoulder within the canister, upon which a gasket is positioned, and with the transverse panel mounted thereon and secured thereto. Vibrating means may also be provided for shaking dust particles from the hollow polymer tubes for self-cleaning thereof and collection as accumulated product particles along a bottom wall of the canister or chamber. When the system is employed in a vehicle, such as a tank truck, the vibrations of the moving truck itself, in conjunction with the low friction tubes, effectively removes the dust from the tubes of the filter. The dust is then collected and re-cycled as discussed above.

Other objects and advantages of the present invention will become apparent from the description that follows.

DESCRIPTION OF THE PREFERRED EMBODIMENT

Figure 1:
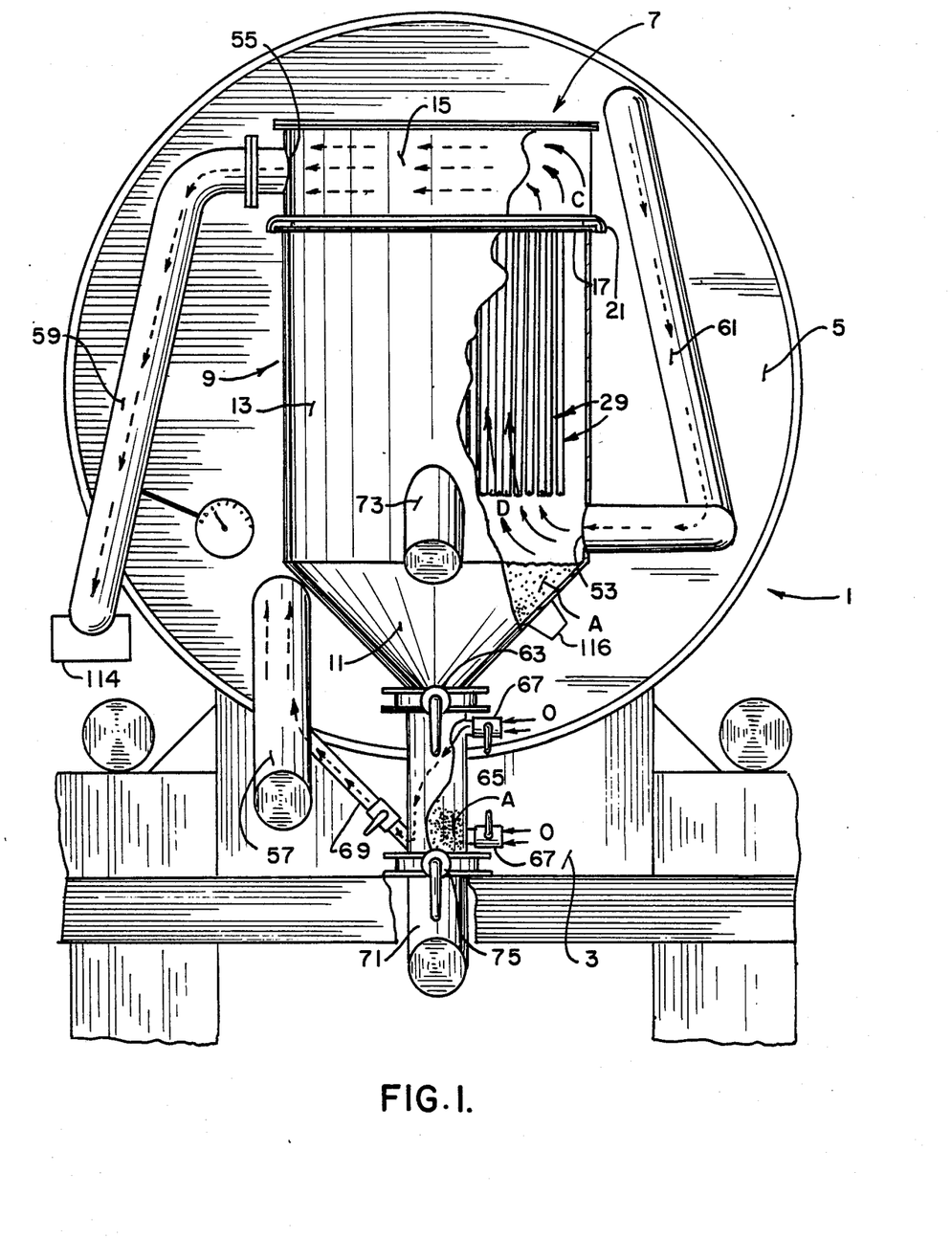
FIG. 1 is a fragmentary front elevational view of a dust filtering and collection system or apparatus mounted on the rear end of a mobile vacuum loading/unloading vehicle, such as a hopper truck.

The dust filtering and collection system of the present invention may be used with the mobile vacuum loading-/unloading vehicle, such as the hopper truck 1 illustrated in FIG. 1 of the drawings, together with the dust filtering system and apparatus specifically shown and illustrated in FIGS. 2-5 of the drawings. In addition, the dust filtering system specifically shown and described in connection with FIGS. 2-5 below may be used in conjunction with other industrial filtering systems and apparatus, if desired.

The hopper truck 1 in FIG. 1 of the drawings includes a supporting frame 3 that provides underlying support for an elongated storage tank or chamber 5 shown in FIG. 1 of the drawings from the rear thereof.

The dust filtering and collection system, illustrated in apparatus form in FIG. 1 of the drawings, is shown as being mounted on the rear of the elongated storage tank or chamber 5; however, it will be appreciated that the dust filtering and collection system 7 may be suitably mounted relative to the elongated storage tank or chamber 5 in a variety of different positions, as may be desired.

The dust filtering and collection system 7 includes an enclosed dust filtering and collection canister 9 having a downwardly tapering bottom wall 11, a peripherally continuous side wall 13 extending upwardly from the bottom wall, and having a closed top or shroud 15 extending over the open upper end of the side wall 13. It will be noted in FIG. 1 of the drawings that the dust filtering and collection canister 9 may be suitably supported relative to the rear end of the elongated storage tank or canister 5 of the hopper truck 1 by any suitable clamping or mounting means, as desired.

Figure 2:
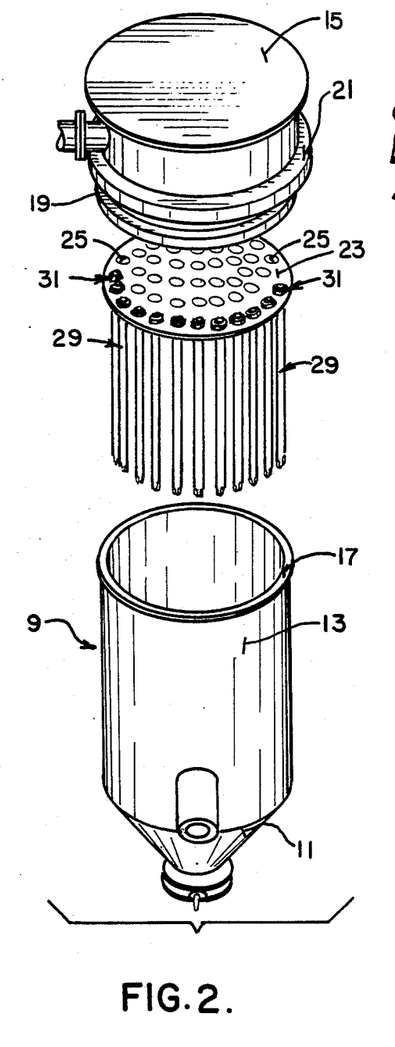
FIG. 2 is an exploded isometric view of the dust filtering and collection system including the dust filtering and collection canister and the series of juxtaposed hollow polymer tubes mounted in a transverse panel suspended within the dust filtering and collection canister.
Figure 3:
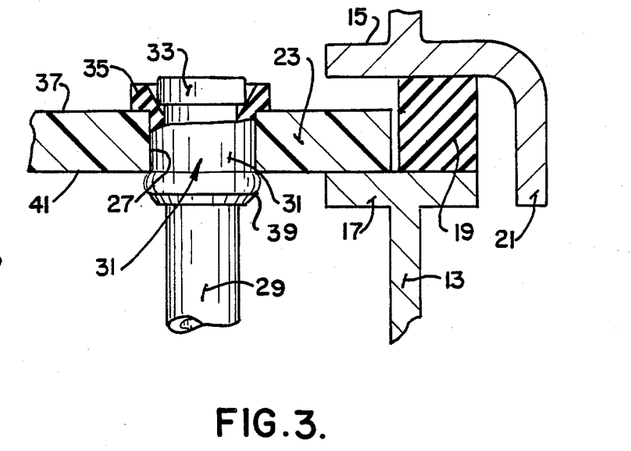
FIG. 3 is a fragmentary side elevational view, partly in section, illustrating the manner in which the hollow polymer tubes are structurally supported by and within resilient material grommets.

FIGS. 2-3 of the drawings show further detail of the dust filtering and collection canister 9, specifically, at the open upper end of the dust filtering and collection canister 9, for purposes presently to be described. The laterally outwardly extending portion of the laterally extending flange 17 receives an annular gasket 19, over which the depending circumferential lip 21 of the closed top 15 extends, to close and seal the canister 9 relative to the closed top 15. The weight of the closed top 15 and vacuum to be established within the closed dust filtering and collection canister 9 maintains the circumferentially depending lip 21 of the closed top 15 in overlying and contacting relationship to the gasket 19 so as to provide a sealed relationship between the overlying top 15 and the dust filtering and collection canister 9. The circumferentially extending and overhanging lip 21 of the overlying top 15 has a lower end that is generally aligned with the laterally extending flange 17 so as to restrict side movement of the overlying top 15 relative to the canister 9.

As best seen in FIG. 3 of the drawings, the inwardly directed portion of the laterally extending flange 17 of the canister 9 also supports a transverse panel 23 which extends across the canister 9 at an upper end thereof. As seen in FIG. 2 of the drawings, the transverse panel 23 has a plurality of adjacent openings 25 formed therein, each opening 25 having a marginal circumferential surface 27 surrounding each opening 25. Each opening 25 receives an elongated hollow polymer tube 29 and is mounted with respect to the transverse panel 23 by a resilient material grommet 31 that surrounds each hollow polymer tube 29 adjacent an upper end thereof. The grommets 31 are received within the openings 25 of the transverse panel and engage the marginal circumferential surface 27 of the transverse panel 23 surrounding each opening 25.

Preferably, the hollow polymer tubes are seamless since they operate best at high pressure conditions, although it has been found that seamed or welded polymer tubes also operate well under most operating pressures.

It will be noted that each of the hollow polymer tubes 29 have an enlarged head 33 at an upper end thereof, and each of the tube grommets 31 also have a complementary enlarged head, such that the enlarged head 35 of the tube grommets 31 overlies and engages one side 37 of the transverse panel 23, while the enlarged head 33 overlies and engages the body and/or enlarged head 35 of a respective tube grommet 31. As a result, the hollow polymer tubes 29 are restricted from moving in one direction, generally toward the bottom wall 11 of the canister 9.

Figure 4:
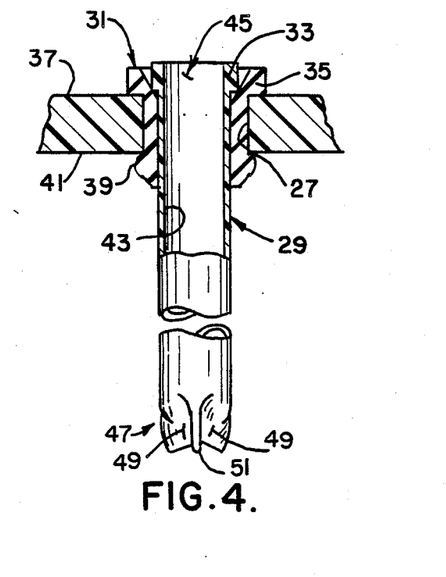
FIG. 4 is a fragmentary side elevational view, partly in section, illustrating the manner in which the resilient material grommets restrict and hold the seamless polymer tubes in relative position to the transverse panel, and further depicting the closed end of the seamless polymer tubes as crimped wall sections thereof.
Figure 5:
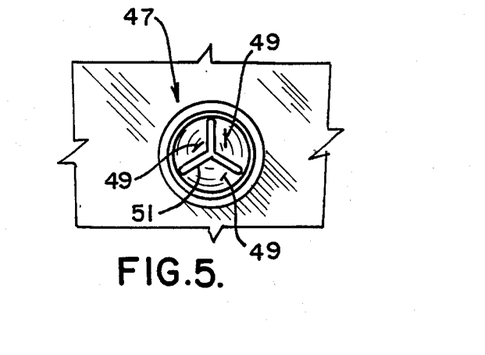
FIG. 5 is a fragmentary bottom plan view of the hollow polymer tube and transverse panel, and specifically illustrating the adjacent wall sections of the closed end of the hollow polymer tubes.

To restrict movement of the hollow polymer tube 29 in an opposite direction extending away from the bottom wall 11 of the canister 9, the resilient material or rubber tube grommets are deformed by the marginal circumferential surface 27 surrounding each of the openings 25 so as to cause the lower end portions 39 of the tubular grommets to be formed into the enlarged or bulbous shape, as illustrated in FIGS. 3-4 of the drawings, for engaging the other side 41 of the transverse panel 23, thereby restricting movement of the hollow polymer tubes 29 in a direction away from the bottom wall 11 of the canister 9. As will be appreciated, the grommets 31 may be constructed in any suitable manner for cooperation with the hollow polymer tubes 29 and the transverse panel 23 so as prevent unauthorized disassembly from the transverse panel 23 under normal operating conditions. To replace a defective worn-out hollow polymer tube 29, a tubular grommet 31 and the hollow polymer tubes 29 can be disassembled from the transverse panel 23; however, under normal operating conditions in the filtering system described below, they are intended to maintain the components in assembled relationship to one another, as described.

The tubular grommets 31 are preferably made from a resilient material such as rubber so as to be not only readily deformable to provide the aforementioned inter-engaging contact with the transverse panel 23, but also for the purpose of providing a pneumatic or air sealed relationship of the hollow polymer tubes 29 relative to the transverse panel 23, for use in the dust filtering system described below.

It will be noted that the hollow polymer tubes 29 have a hollow interior 43 with an open upper end 45 surrounded by the enlarged or rolled head 33 and the lower closed end 47. The lower closed end 47 of each seamless polymer tube 29 may include crimped and sealed wall sections 49 which are brought together to form the Y-shaped re-enforced end section 51 at the bottom of the closed lower wall 47. This provides a simplified method of forming a closed lower end wall, while at the same time forming a structurally re-enforced closed lower end wall 47 for the hollow polymer tubes 29.

For use in the dust filtering system of the present invention, a plurality of juxtaposed seamless polymer tubes 29 are suspended and supported by the transverse panel 23 which carry the polymer tubes, when engaged by the laterally extending flange 17 of the canister 9. As shown in FIG. 1 of the drawings, the juxtaposed hollow polymer tubes extend downwardly within the canister 9 and are sealed relative to the transverse panel 23 by the resilient material tubular grommets 31 or other suitable sealing means.

Each of the hollow polymer tubes have a porosity permitting air to be drawn therethrough into the hollow interior 43 thereof while removing dust particles from an incoming dust laden air stream entering the canister 9. Preferably, polyethylene or teflon hollow polymer tubes 29 having about a 40-50 micron porosity along the outer wall of the tubes have been found to be quite effective. The tubes are constructed such that air may pass through 40-50 micron porosity openings in an outer wall, pass through tortuous paths or openings in the tube wall, and then be constricted to a 2.5 micron opening along the inner wall of the tubes, for filtering purposes. Both polyethylene and "Teflon" tubes keep dust particles off the outer surface of the seamless polymer tubes, with "Teflon" having more lubricity, thus making it more difficult for dust particles to accumulate on the outer wall surface of the hollow polymer tubes 29. It has also been found that by making polymer tubes with no seams, the polymer tubes 29 can withstand much more wear and tear during life cycle use of the tubes. Also, with the enlarged head 33 at the open upper end 45 and the structurally re-enforced and rigid closed lower end 47, the seamless polymer tubes 29 provide no seam whatsoever in their construction, and this greatly increases the life span of the seamless polymer tubes 29, when used in the dust filtering system.

The dust filtering canister 9, with the juxtaposed hollow polymer tubes 29 suspended therein and having the closed top 15 sealed with respect to the canister 9, such as by the gasket 19, provides a dust filtering system for filtering dust particles from, incoming dust laden air stream entering the dust filtering canister 9. The dust inlet 53 is shown in the bottom wall of the canister 9, generally below the suspended juxtaposed polymer tubes 29, and a clean air outlet 55 is provided in the upper end of the canister 9, above the transverse panel 23, and is preferably formed in the closed top or shroud 15, as will be understood. An incoming dust laden air stream, represented by the arrows labeled D entering the dust inlet 53 of the canister 9 will thus be directed upwardly toward the hollow polymer tubes 29, which serve as filtering elements in the dust filtering system. To enhance the movement of the dust laden air stream D toward the hollow polymer tubes 29, the clean air outlet 55 is typically connected to a vacuum source 114 or venting of pressure from a bin, so as to create a negative pressure within the hollow interior 43 of the seamless polymer tubes 29 causing the dust laden air stream D to be drawn to the plurality of juxtaposed seamless polymer tubes 29. Because of the 40-50 micron porosity and tortuous path of the seamless polymer tubes 29, air can pass through the porous openings in the hollow polymer tubes 29, while dust particles remain on the outside surface of the seamless polymer tubes 29 or fall to the tapered bottom wall 11 of the canister 9. The accumulated product particles represented by the A in FIG. 1 of the drawings are illustrated as be accumulated on the bottom area or along the tapered bottom wall 11 of the canister 9, as will be appreciated. Clean air represented by arrows C above the transverse panel 23 is exhausted through the clean air outlet 55.

A suitable vibrating source 116 may be used to shake or vibrate the canister 9 so as to remove dust particles from the outer wall surface of the seamless polymer tubes 29, causing the dust particles to fall and be accumulated along the bottom area of the canister 9. When the dust filtering system is used in a hopper truck 1, shown in FIG. 1, movement of the hopper truck alone, following loading or unloading thereof, will vibrate the canister 9 and included seamless polymer tubes 29, thus providing self-cleaning of the seamless polymer tube 29.

When used with a mobile vacuum loading/unloading vehicle, such as the hopper truck 1 illustrated in FIG. 1 of the drawings, the dust filtering system may also be constructed to serve as a dust filtering and collection system, enabling the accumulated product particles collected along the bottom area or bottom wall of the canister 9 to be recovered and returned to a storage chamber from which the dust laden air stream D has emanated, so as to eliminate any waste of the accumulated product particles A. Prior art systems simply allow the accumulated product particles to be removed through a gravity flow product discharge valve, thus removing the accumulated product particles from the system, and causing them to be contaminated. According to the present invention; however, the dust filtering and collection system, generally identified at 7 in FIG. 1 of the drawings, not only filters an incoming dust laden air stream represented by the arrows D so as to allow a clean air stream, represented by the arrows C to be exhausted from the system, but also recovers and returns accumulated product particles A to a storage chamber from which the dust laden air stream has emanated.

In the construction shown in FIG. 1 of the drawings, the dust filtering and collection system is shown as being used for product loading of the elongated storage tank or chamber 5, as well as unloading of the storage tank or chamber 5 into a customer's storage facility.

When used to load free flowing particulate matter such as starch, flour, kaolin clay, soda ash, hydrate lime, plastic pellets, etc. into the storage tank or chamber 5 of the hopper truck 1, product line 57, extending from the storage tank or chamber 5 is connected to a railcar or other off line storage facility. A vacuum source is connected to the product line 57 so as readily draw free flowing bulk particulate material into the storage tank or chamber 5 of the hopper truck 1. As will be appreciated, the loading operation will create substantial dust emissions, and in order to filter the dust emissions, a line 59 is connected to the intake side of the positive displacement blower or vacuum source (not shown) so as to create a partial vacuum at the clean air outlet 55 of the canister 9. The dotted arrows in line 59 also represent the air flow path within the line 59. Thus, a negative differential pressure or partial vacuum will be created at the clean air outlet 55, above the transverse panel 23 from which are suspended the elongated endless polymer filtering tubes 29. Return air flow line 61 is connected from the storage tank or chamber 5 to the dust inlet 53, thus allowing the dust laden air stream, represented by the dotted arrows in the line 61 to pass through the dust inlet 53 and enter the canister 9 as the dust laden air stream D, as illustrated. The filtering of the dust particles from the dust laden air stream will be accomplished as described above, with dust particles removed from the filtering tubes 29 falling to the bottom area or bottom wall of the canister 9 so as to be accumulated as product particles A, as also illustrated.

For collecting the accumulated product particles A, the gravity flow valve 63 positioned between the canister 9 and recovery chamber 65, allows the accumulated product particles A to be gravity flow conveyed to the recovery chamber 65.

One or more pneumatic or air flow valves 67 may be associated relative to the recovery chamber 65, such that outside air represented by the arrows 0, may enter into the recovery chamber 65 and assist in conveying the accumulated product particles A from the recovery chamber 65 back into the product line 57 via an interconnecting passageway 69 extending between the recovery chamber 65 and the product line 57. As a result, no waste of the accumulated product particles A is possible since the dust filtering and collection system 7 recovers and returns the accumulated product particles A to the storage tank or chamber 5 from which the dust laden air stream has emanated.

When unloading free flowing bulk particulate matter from the storage tank or chamber 5 of the hopper truck 1, the discharge line 71 from the storage tank or chamber 5 is connected to the customer's storage facility, which will pressure unload flowing particulate matter from the storage tank or chamber 5 of the hopper truck 1. A dust connecting line from the customer's facility is attached to the dust filtering and collecting canister 9 at the tubular connection or line 73, extending from the canister 9, allowing the dust laden air stream to enter the canister 9 through the on line 73. Again, filtering by the elongated hollow polymer filtering tubes 29 will be accomplished, in the same manner as described above.

For recovering and returning accumulated product particles A, a gravity flow valve 63 may again be opened to allow gravity flow feeding of the accumulated product particles A from the canister 9 to the recovery chamber 65. It will be noted that a second gravity flow valve 75 is positioned at the lower end of the recovery chamber 65, which may be opened to allow gravity feeding of the accumulated product particles A back into the discharge line 1 that is transporting product from the storage tank or chamber 5 to the customer's facility.

The present invention contemplates numerous modified forms and different embodiments which are shown in FIG. 6–13 of the drawings. The dust filtering and collection system 80 illustrated in FIG. 6 of the drawings is similar to the FIGS. 1–5 embodiment, except with respect to the modified constructions generally designated 82, 84, 86 and 88 and which are specifically described in connection with each of FIGS. 7–13 below.

Figure 6:
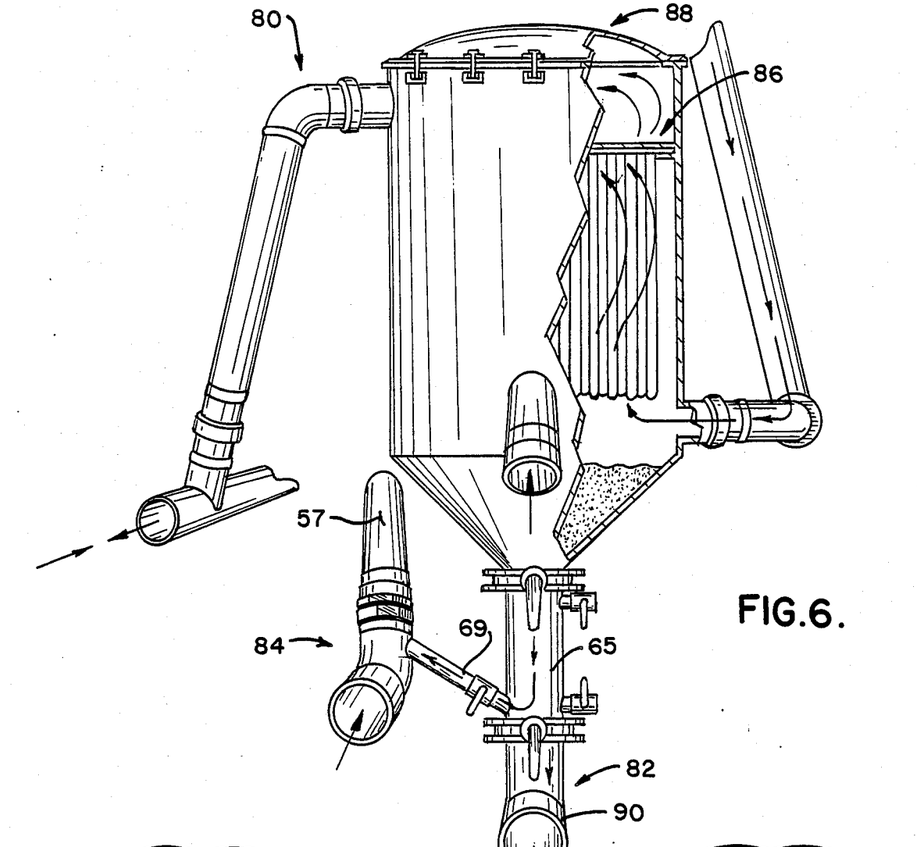
FIG. 6 is a fragmentary isometric view of a modified form of dust filtering and collection system or apparatus coming within the purview of the present invention.
Figure 7:
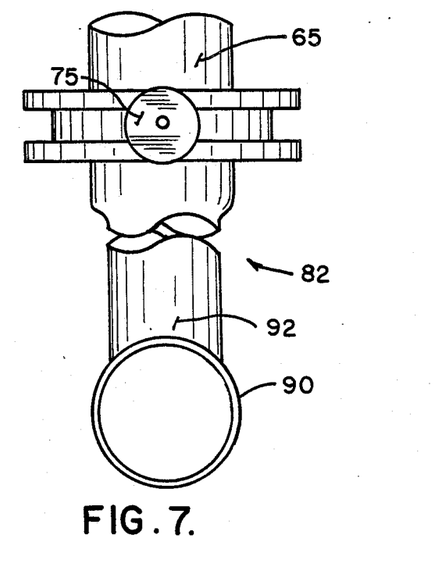
FIG. 7 is a fragmentary front elevational view of modified connecting passageways between a recovery chamber and a product discharge line.
Figure 8:
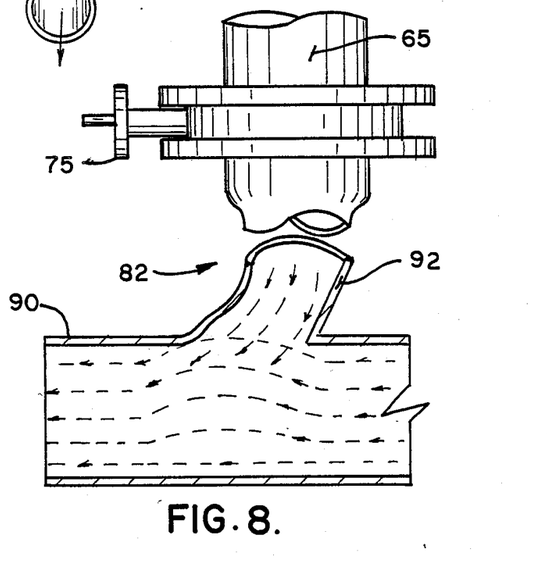
FIG. 8 is a fragmentary side elevational view, partially in section of the modified connecting passageways shown in FIG. 7.

The area designated 82 in FIG. 6 of the drawings is specifically identified in FIG. 7–8 of the drawings as the interconnection between the bottom of a storage chamber 65 and a main flow line 90 which extends beneath the hopper of a hopper truck, for conveying materials from within a hopper truck to customer's facility. At the bottom of the recovery chamber 65 is a gravity flow valve 75 which operates, as previously described, to allow accumulated product particles A to be released therefrom. In the FIGS. 7–8 embodiment, there is a smaller diameter angled angular interconnection 92 which interconnects the bottom of the recovery chamber 65 to the discharge line 90. The purpose of the smaller diameter angled tubular section 92 is to afford a venturi effect, as represented by the curved arrows in FIG. 8, created by air flowing in the larger diameter discharge line 90 passing by the smaller diameter angled tubular section 92. As a result, low pressure is developed, as air passes the smaller diameter angled tubular section 92, facilitating a quicker and better discharge of the accumulated product particles from the recovery chamber 65 into the main discharge line 90.

Figure 9:
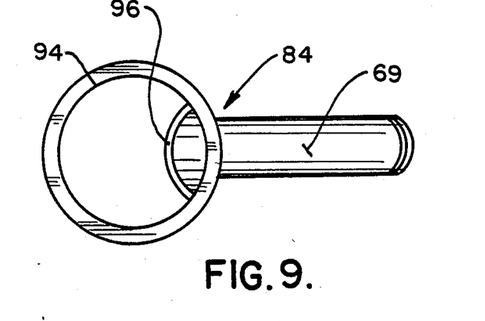
FIG. 9 is a top plan view of a modified form of vacuum line for returning accumulated product particles to a storage chamber.
Figure 10:
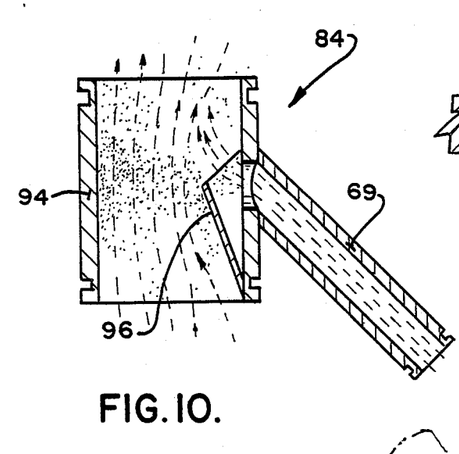
FIG. 10 is a sectional view of the modified form of vacuum line shown in FIG. 9.

With respect to the modified area 84 seen in FIGS. 9–10 of the drawings, it will be noted that the interconnecting passageway 69, extending between the recovery chamber 65 and the product line 57, is connected to a modified tubular section 94 having a deflector means or plate 96 therein. The purpose of the deflector means or plate 96 is to constrict the flow of air through the tubular section 94, thereby creating a greater vacuum or draw of accumulated product particles through the interconnecting passageway 69, to enhance product flow through the product line 57. In actual practice, it has been found that up to 14% greater vacuum or negative pressure draw out of the pipe 69 is provided as a result of the deflector means or plate 96, to greatly enhance the flow and movement of accumulated product particles from the interconnecting passageway 69 into the tubular section 94 forming part of the product discharge line 57.

Figure 11:
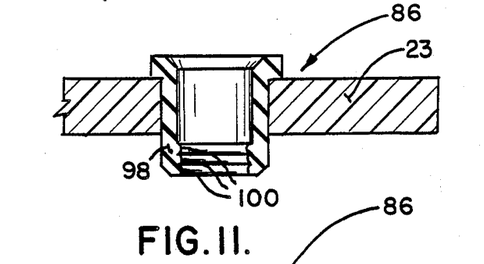
FIG. 11 is a sectional view of a modified form of grommet for retaining hollow polymer tubes in the collection chamber or canister.
Figure 12:
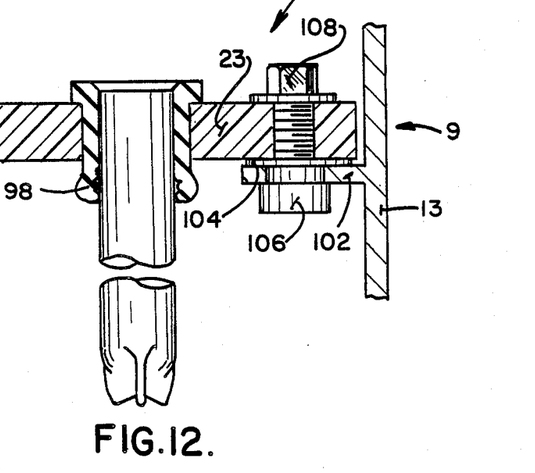
FIG. 12 is a sectional view of a modified form of mounting means for the transverse panel within the collection chamber or canister.

The modified area 86 of the FIG. 6 embodiment is best illustrated in FIGS. 11–12 of the drawings. In this case, there are two modified or alternative forms. First, it will be noted that the grommet 98 in FIGS. 11–12 is different from the grommet 31 in the FIGS. 1–5 embodiment in that the internal wall of the grommet 98 includes a series of closely positioned O-ring-like ribs or ridges 100 extending circumferentially about the inner wall of the grommet 98. It has been found that grommets 98 with the internally arranged O-ring-like ribs or ridges 100 has a greater tendency to grip the outside surface of the hollow polymer tubes. Even after a period of time, the O-ring ribs or ridges 100 have a tendency to cause indentations to be formed in the outer surface of the hollow polymer tubes 29, to provide better seating, particularly under high pressure conditions of operation, in order to prevent the tubes 29 from creeping or moving up out of their assembled relationship relative to the grommets 98.

The second modification shown by the modified area 86 relates to the manner in which the transverse panel 23 is mounted relative to the canister 9. As shown in FIG. 12 of the drawing, the side wall or bulk head 13 of the canister 9 includes an internally extending shelf or shoulder 102 on which a specially formed gasket 104 is received. The gasket 104 has a series of openings therethrough, corresponding with openings in the shelf or shoulder 102 for receiving a special ⅜ inch pem nut fastener 106 that complementary receives the threaded male fastener 108 extending through the transverse panel 23. As shown in FIG. 12 of the drawings, the pem nut fastener 106 is pressure fit to extend through the corresponding openings in the shelf or shoulder 102 and gasket 104, so as to provide a positive hold on to the side wall or bulkhead 13. This prevents transverse panel 23 from rising up as the result of any pressure within the canister 9, below the transverse panel 23. There may be a plurality of pem nut fasteners holding the gasket 104 and the associated internal shoulder or flange 102 in place.

Figure 13:
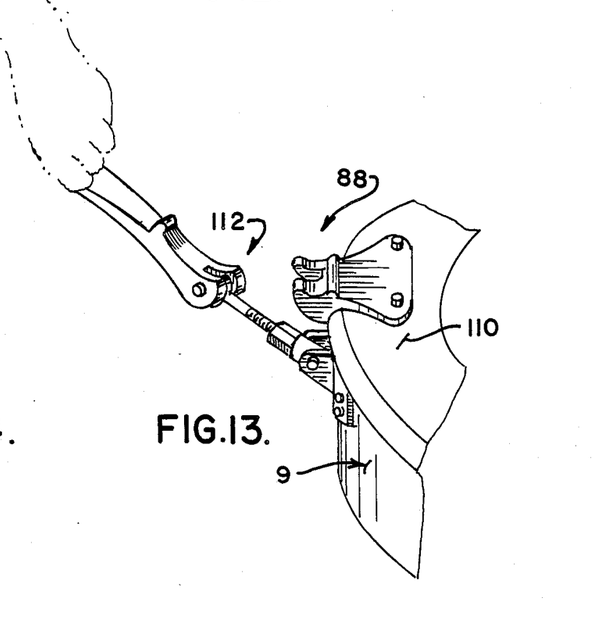
FIG. 13 is a fragmentary isometric view of a modified form of canister top locking or securing means, in unlocked position.
Figure 14:
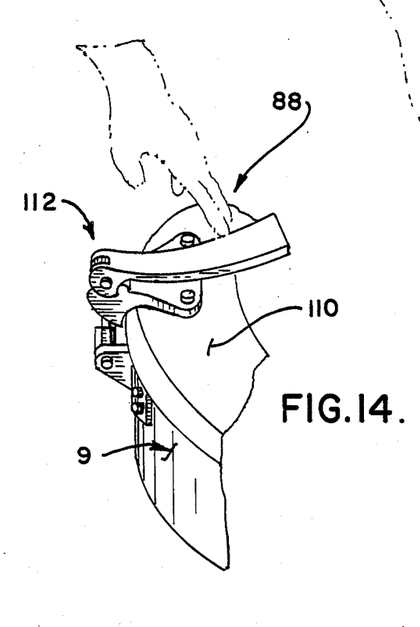
FIG. 14 is a fragmentary isometric vie of the modified form of locking or securing means, as shown in FIG. 13, but in locking position; Corresponding reference numerals will be used throughout the various figures of the drawings.

The modified area 88 of the FIG. 6 embodiment is illustrated in FIGS. 13–14 of the drawings and includes an alternative means for holding a lid 110 relative to the canister 9. In lieu of the male and female threaded fasteners employed in the FIGS. 1–5 embodiment, it will be seen in FIGS. 13–14 that a cam and eye-bolt pivot-block fastener 112 may be utilized. FIG. 13 illustrates these commonly utilized cam and eye-bolt pivot-block fasteners 112 in an opened condition, while FIG. 14 illustrates how the cooperating components are interlocked relative to one another to securely lock and hold the lid 110 relative to the canister 9.

It will, of course, be understood that other modified components and designs may be utilized in the dust filtering and collection system of the present invention, including the shape and location of the canister tank and the various connecting pipes emanating therefrom or connected thereto. In addition, by appropriate configurations, dimensions and arrangement, the dust filtering and collection system may be used on hopper trucks, industrial environments, rail car applications, and the like, as will be understood.

From the foregoing, it will now be appreciated that the present invention provides a dust filtering and collection system as well as a method of filtering and collecting filtered dust particles from an incoming dust laden air stream entering an enclosed dust filtering and collection canister or chamber. Dust particles are separated from the incoming dust laden air stream and the dust cleansed air stream is exhausted from the dust filtering and collection chamber as clean air. The dust particles are collected as accumulated product particles within the canister or chamber and then are returned as accumulated product particles to a storage chamber from which the incoming dust laden air stream has emanated.

In addition, the present invention provides a new and improved dust filtering system in which a plurality of juxtaposed hollow polymer filtering tubes are suspended and supported by a transverse panel within an enclosed canister or chamber, each of the hollow polymer or filtering tubes being sealed relative to the transverse panel and having a porosity permitting air to be drawn therethrough while removing dust particles from an incoming dust laden air stream.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in limiting sense.

I claim:

1. A dust filtering and collection system for use in a mobile vacuum loading/unloading vehicle comprising:
   an enclosed dust filtering and collection canister having a bottom wall, peripheral side wall and a closed top;
   a dust filtering system suspended within said dust filtering and collection canister;
   a dust inlet in the side wall of said canister below said dust filtering system and adapted to be connected to an incoming dust laden air stream;
   a clean air outlet above the dust filtering system;
   a vacuum source, said vacuum source being connected to said clean air outlet to draw the incoming dust laden air stream past said dust filtering system for removing the dust therefrom to allow clean air to be withdrawn through the clean air outlet while enabling the collection of dust particles as accumulated product particles around the bottom wall of said canister; said dust filtering system suspended within said dust filtering and collection canister and includes a plurality of juxtaposed hollow polymer tubes having a porosity permitting air to be drawn therethrough while removing dust particles from the incoming dust laden air stream;
   said plurality of juxtaposed hollow polymer tubes having a closed lower end and an opened upper end;

said plurality of juxtaposed hollow polymer tubes being suspended and supported by a transverse panel extending across said canister adjacent the closed top; each of said tubes formed having an outer wall, and inner wall thereof, each of said tubes having openings formed therein, with the openings proximate the outer wall being approximately 40–50 microns porosity along said outer wall, each of said tubes having a plurality of openings provided along the inner wall thereof, and each of said openings being about 2.5 microns, and an inner tortuous pathway interconnecting the outer wall openings with an inner wall openings to provide a pathway therethrough, thereby permitting air to be drawn through said polymer tubes while removing dust particles from an incoming dust laden air stream entering into said dust inlet, and said filtering system being arranged within said canister and between the dust inlet and the clean air outlet of said canister.

2. The dust filtering and collection system as defined in claim 1 wherein said means for recovering and returning said accumulated product particles to a storage chamber includes venturi means incorporated in return product flow lines.

3. The dust filtering and collection system as defined in claim 1 wherein the closed lower end of said hollow polymer tubes includes crimped and sealed wall sections formed from each polymer tube.

4. The dust filtering and collection system as defined in claim 1 including vibration means for shaking dust particles form said hollow polymer tubes for collection as accumulated product particles on the bottom wall of said canister.

5. The improvement as defined in claim 1 wherein said hollow polymer are made from polyethylene.

6. The improvement as defined in claim 1 wherein said hollow tubes are made from Teflon.

7. The improvement as defined in claim 1 wherein said transverse panel is circumferentially supported by a canister flange at the upper end thereof, a gasket surrounding said transverse panel and also supported by said canister flange, and a separate closed top overlying said canister and engaging said gasket to provide said aforementioned enclosed dust filtering and collection canister.

8. The improvement as defined in claim 1 wherein the transverse panel is mounted and secured to an inwardly extending shoulder of said canister with a gasket therebetween.

9. The dust filtering and collection system as defined in claim 1 wherein said means for recovering and returning said accumulated product particles to a storage chamber includes a recovery chamber and a passageway interconnecting said recovery chamber to a vacuum line carrying accumulated product particles to a storage chamber.

10. The dust filtering and collection system as defined in claim 9 and including a first valve means between said canister and recovery chamber which is opened to allow accumulated product particles to be conveyed from said canister to said recovery chamber, and second valve means interconnecting said recovery chamber and said passageway to said vacuum line carrying accumulated product particles to a storage chamber.

11. The dust filtering and collection system as defined in claim 10 wherein at least said first valve means is a product discharge valve.

12. The dust filtering and collection system as defined in claim 11 wherein at least said second valve means are pneumatic valve means enabling air to be drawing into said recovery chamber to facilitate movement of accumulated product particles to a storage chamber.

13. The dust filtering and collection system as defined in claim 11 wherein both said first and second Valve means are product discharge valves.

14. The dust filtering and collection system as defined in claim 13 wherein at least said second valve means are also pneumatic valve means enabling air to be drawn into said recovery chamber to facilitate movement of accumulated products particles to a storage chamber.

15. The dust filtering and collection system as defined in claim 9 and including deflector means in said vacuum line in the vicinity of the interconnection with said passageway to enhance flow of accumulated product particles from said passageway.

16. The dust filtering and collection system as defined in claim 1 and including individual tube grommets mounted within openings in said transverse panel for retaining and sealing said hollow polymer tubes therein.

17. The dust filtering and collection system as defined in claim 16 wherein each hollow polymer tube has an enlarged head surrounding the open upper end thereof, and said tube grommets have a complementary enlarged head for engaging the enlarged head of each hollow polymer tube to engage one side of said transverse panel and restrict movement of said tubes in one direction, and said tube grommets having circumferential O-ring sections along an inner wall thereof for securely gripping an outer surface of said tubes when mounted in said transverse panel.

18. The dust filtering and collection system as defined in claim 17 wherein the transverse panel is mounted and secured to an inwardly extending shoulder of said canister with a gasket therebetween.

19. The dust filtering and collection system as defined in claim 17 wherein said transverse panel is circumferentially supported by a flange at an upper end of said canister, a gasket surrounding said transverse panel and also supported by said canister flange, and a separate closed top overlying said canister and engaging said gasket to provide said aforementioned enclosed dust filtering and collection container.

20. The improvement as defined in claim 19 and including vibrating means for shaking dust particles from said hollow plastic tubes for collection as accumulated product particles by said canister along a bottom wall thereof.

21. The improvement as defined in claim 19 and further including means associated with said canister for returning accumulated product particles collected along a bottom wall of said canister to a storage chamber in which accumulated product particles are collected and stored in bulk quantity.

22. The improvement as defined in claim 1 wherein said transverse panel is positioned below said clean air outlet, and each of said tubes having a closed lower end extending below said transverse panel and an open upper end extending above said transverse panel.

23. The improvement as defined in claim 22 wherein the closed lower end of said hollow polymer tubes includes crimped and sealed wall sections formed from each polymer tube.

24. The improvement as defined in claim 23 and including individual tube grommets made of resilient material mounted within openings in said transverse panel for retaining and sealing said hollow polymer tubes therein.

25. The improvement as define in claim 24 wherein each hollow polymer tube has an enlarged head surrounding the open upper end thereof, and said tube grommets have a complementary enlarged head for engaging the enlarged head of a hollow polymer tube and also engaging one side of said transverse panel so as to restrict movement of said tubes in one direction, and said tube grommets having adjacent O-ring ribs along an inner wall thereof for gripping an outer surface of said tubes when mounted in said transverse panel.

* * * * *